Aug. 15, 1961     C. FELDMAN     2,996,404
ZINC PHOSPHATE LUMINESCENT SCREENS AND METHOD OF MAKING SAME
Filed April 8, 1957
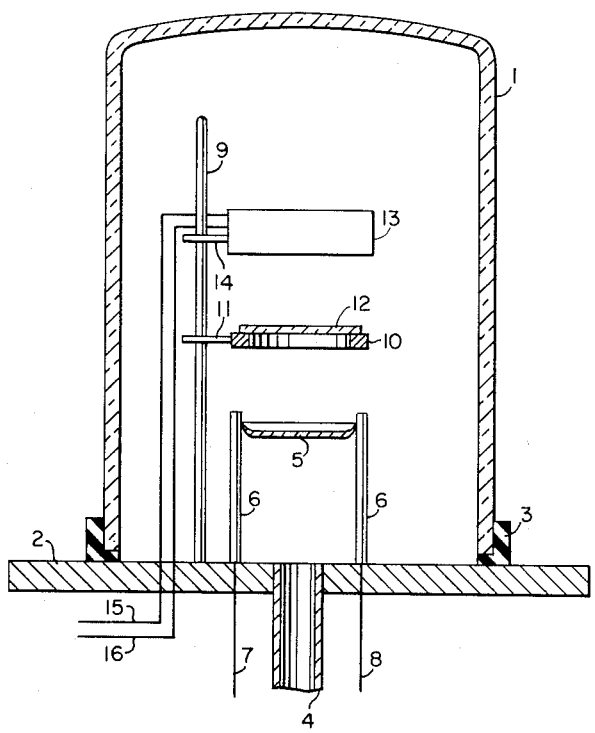
INVENTOR
CHARLES FELDMAN
BY
ATTORNEYS

2,996,404
ZINC PHOSPHATE LUMINESCENT SCREENS AND METHOD OF MAKING SAME

Charles Feldman, Hollin Hills, Va., assignor to Davohn Corporation, a corporation of Delaware
Filed Apr. 8, 1957, Ser. No. 651,560
10 Claims. (Cl. 117—33.5)
(Granted under Title 35, U.S. Code (1952), sec. 266)

The invention described herein may be manufactured and used by or for the Government of the United States of America for governmental purposes without the payment of any royalties thereon or therefor.

This invention relates to new luminescent screens suitable for use in cathode ray tubes.

Transparent luminescent screens have the known advantage in cathode ray tubes of minimizing light scattering and giving better definition in the light image than the powder phosphor screens. Despite this advantage, however, little has been done by way of providing transparent luminescent screens of a luminescent brightness practical for cathode ray tubes.

It is an object of the present invention to provide new luminescent screens of a luminescent brightness practical for cathode ray tubes. It is a further object to provide new transparent and new translucent luminescent screens of a luminescent brightness practical for cathode ray tubes. It is also an object to provide a method for producing these new luminescent screens.

I have found in accordance with my invention that transparent luminescent screens of a luminescent brightness practical for application in cathode ray tubes can be obtained by vaporizing zinc phosphate and a luminescence activator material and depositing a thin film of the vapors in a transparent glass, in the manner hereafter described, and subjecting the thin film and base to baking in air at a temperature between about 500 and 800° C., preferably between about 550 and 600° C., for a period of between about 15 minutes and an hour to form a luminescent film. The baking is conducted until the film is activated to luminesce in the color characteristic of the activator and the concentraiton thereof in the film. With manganese as activator, this color moves from green to red in a range of concentrations of the activator in the film of from about 1 to 10 mol percent, the color being red for the upper portion of the concentration range beginning at about 5 mol percent. By continuing the baking of the films for longer periods up to about three hours, translucent luminescent screens of a lower light transmitting efficiency but of greater luminescent brightness can be obtained.

The initial films for producing the luminescent screens of my invention are formed by an application of the known vacuum evaporation-deposition process. In the application of this process, the zinc phosphate and the luminescence activator material are vaporized and the vapors condensed on the transparent substrate within a high vacuum, e.g., of the order of $10^{-4}$ to $5 \times 10^{-5}$ mm. Hg, the process being controlled to deposit thin films of the order of thickness of about 0.5 to 5 microns on the substrate. The initial film on the substrate contains the solid components of the zinc phosphate, but not the zinc phosphate as such. The solid components of the zinc phosphate are zinc, zinc oxide, phosphorus and the phosphorus oxides. The necessary oxygen for formation of the zinc phosphate from the solid components in the film is supplied from the air in the subsequent air baking of the film.

The solid components of the zinc phosphate can be used in place of the zinc phosphate as starting materials for forming the initial film on the substrate, for example, zinc or zinc oxide and phosphorus. The vaporization of the solid components is conducted from separate vessels within the high vacuum and controlled so as to deposit the vapors of the solid components on the substrate in the correct proportions for forming the zinc phosphate therefrom in the subsequent baking of the film in the presence of oxygen (air).

The activator may be supplied in the film by using commercial activated zinc phosphate phosphor powders for making of the films. It may be also supplied by separately and simultaneously vaporizing the activator material and the zinc phosphate or its solid components and condensing the vapors on the substrate within the high vacuum. Manganese is a preferred activator for the production of the luminescent screens of the invention. However, other activators can be employed. Coactivators may be used along with the activator where particular results are desired in the luminescent screens, such as sensitizing the luminescent film to ultraviolet light or improving the persistence of the luminescence thereof.

Baking of the initial films after they have been deposited on the base or substrate is of great importance. Contrary to an assumption expressed in the literature the activator is not almost always lost in the vacuum evaporation-deposition process, but probably exists mostly as a separate phase in the film. The baking serves the important functions of promoting formation of the zinc phosphate from its components on the substrate, inducing good crystallite formation of the zinc phosphate and causing the activator to diffuse into the formed crystallites of the zinc phosphate film. The occurrence of these conditions are necessary to form luminescent films of good efficiency.

An apparatus suitable for carrying out the method of the invention is illustrated in the single figure of the accompanying drawing which is a partly sectional view of the general arrangement of the parts of the apparatus.

Referring to the drawing a vacuum cover 1, suitably made of glass, is arranged in vacuum tight relationship on a platform 2 of polished steel by means of a circumferential gasket 3 of heat-resistant rubber (neoprene). A conduit 4 is arranged through the platform 2 for evacuating the vessel 1 by means of a vacuum pump (not shown). A boat-shaped vessel 5 of tantalum or of other electrically conductive refractory material for containing the zinc phosphate and activator material to be evaporated is supported by means of a pair of electrically conductive (brass) standards 6. A clamping piece (not shown) is arranged on the upper end of each of the standards 6 for clamping the vessel 5 at its tapered ends to the standards. The standards 6 are attached to the platform 2 in any suitable manner and connected to the electrical leads 7 and 8 from a suitable current source. A metal standard 9 suitably attached to the platform 2 carries a steel ring 10 adjustably mounted thereon by means of a slidable clamping arm 11 extending from the ring. The transparent base or substrate 12 to be coated with the initial film rests upon the ring 10.

A radiant heater 13 of conventional design is provided in the vessel 1 for outgassing of the transparent base or substrate 12 prior to the coating operation and adjustably mounted on the standard 9 by means of a slidable clamping arm 14. It is connected by means of the electrical leads 15 and 16 to a suitable current source.

The method of my invention is carried out in the aforedescribed apparatus in the following manner and is illustrated by the preparation of a transparent luminescent zinc phosphate $Zn_2(PO_4)_3$, screen. A quantity of a high grade commercial zinc phosphate manganese activated phosphor powder, $Zn_2(PO_4)_3(Mn)$ of 5 to 10 mol percent manganese is placed in the tantalum boat 5. The transparent base or substrate 12 of glass is placed on the ring support 10 in position to receive the vaporized material from the boat 5. The vacuum hood or cover 1 is brought down over the substrate 12 and boat 5 in vacuum tight relationship with the platform 2 and the resulting vessel evacuated to a pressure about $5 \times 10^{-5}$ mm. Hg. The substrate 12 is out-gassed by heating in the vacuum at about 300 to 500° C. for about thirty minutes to an hour. The necessary heat is delivered by operation of the radiant heater 13. When the substrate 12 has been cleaned in this way, it is cooled in the vacuum to about room temperature. Maintaining the vacuum, the tantalum boat 5 is electrically heated to evaporate the zinc phosphate phosphor powder.

Deposition of the vapors occurs on the under side of the substrate 12. The duration of the evaporation will depend upon the quantity of the material to be evaporated (thickness of the film to be deposited on the substrate 12), the size of the boat 5 and the temperature of the boat. It is recommended that the evaporation and by consequence the deposition of the vapors be carried out rather slowly for best results in the film. With a tantalum boat at a temperature of about 1,000 to 1300° C., the duration of the evaporation should be from about one hour for temperatures in the lower portion to lesser periods for temperatures in the upper portion of this heating range. The temperature of the boat can be determined with an optical pyrometer.

The initial film thus formed is now baked (fired) in air at a temperature of from about 500 to 800° C., preferably at from about 550 to 600° C., for a period of from about 15 minutes to an hour until the resulting activated film of zinc phosphate luminesces in red. The baking can be carried out in a conventional, electrically heated furnace. The baking period for the films will depend in general on the thickness of the film and the temperature of the baking, the thinner films and the higher baking temperatures requiring the shorter baking periods.

By extending the baking period in air for a total firing time up to about three hours, grain growth can be induced in transparent luminescent screens of zinc phosphate, starting from the surface of the film. Depending on the temperature and length of the baking, fogging of the film can be effected to varying depths with resulting production of translucent luminescent screens which possess a greater degree of luminescent brightness but a lower degree of light transmission than the transparent luminescent screens. The greater the depth of the fogging of the film the greater generally the increase in luminescent brightness of the translucent screens.

Proceeding in the above manner and employing amounts of manganese within the range of about 1 up to less than 5 mol percent, transparent and translucent luminescent zinc phosphate screens which luminesce in green, instead of red, can be obtained.

Transparent and translucent luminescent zinc phosphate screens of the invention may be used in the construction of cathode ray tubes for daylight viewing of the image, the inner surface of the walls of the tube being covered with a light absorbing coating. A suitable material for the coating is aquadag (an aqueous dispersion of graphite), although other coating materials of high light absorbing quality may also be used.

The above described method is also applicable for the production of opaque luminescent screens in which the base or substrate for the luminescent film is a sheet of platinum or a ceramic plate of a metal oxide such as aluminum oxide ($Al_2O_3$) or a sheet or plate of other refractory, non-oxidizing opaque material. The luminescent films of such opaque screens can be transparent or translucent as above. Opaque luminescent screens of this kind are useful in the construction of cathode ray tubes in which indirect viewing of the light image is to be practiced. Memory tubes are illustrative of this kind of cathode ray tubes.

Since the invention may be variously practiced without departing from the spirit or scope thereof, it is to be understood that specific embodiments of the invention appearing in the above description shall be taken as illustrative rather than in limitation except as may be required by the appended claims.

What is claimed is:

1. A method of making a luminescent screen which comprises condensing the vaporized solid components of zinc phosphate and a vaporized luminescence activator material within a high vacuum on a smooth surface of a refractory non-oxidizing base to form a thin film on said base containing said solid components in the correct proportions for forming zinc phosphate therefrom on baking said film in the presence of oxygen, and subjecting said film and base to baking in the presence of oxygen at a temperature and for a time sufficient to form a crystalline metal phosphate and render said film luminescent.

2. A method of making a luminescent screen which comprises the steps carried out within a high vacuum of subjecting the solid components of zinc phosphate and a luminescence activator material to evaporation and condensing the resulting vapors on a smooth surface of a refractory non-oxidizing base to form a thin film on said base containing said solid components in the correct proportions for forming zinc phosphate therefrom on baking said film in the presence of oxygen, and subjecting said film and base to baking in the presence of oxygen at a temperature and for time sufficient to form a crystalline zinc phosphate and render said film luminescent.

3. The method as defined in claim 2, wherein the baking of said film and base is conducted in air.

4. A method of making a luminescent screen which comprises the steps carried out within a high vacuum of subjecting zinc phosphate and a luminescence activator to evaporation and condensing the resulting vapors on a smooth surface of a refractory non-oxidizing base to form a thin film thereon, and subjecting said film and base to baking in the presence of oxygen at a temperature and for a time sufficient to form crystalline zinc phosphate and render said film luminescent.

5. The method as defined in claim 4, wherein the film base is a transparent refractory base.

6. The method as defined in claim 4 wherein the film base is a transparent refractory glass base.

7. The method as defined in claim 6, wherein the baking of the film on the base is conducted in air.

8. A luminescent screen comprising a thin transparent crystalline film of luminescence-activated zinc phosphate on a smooth surface of a refractory non-oxidizing base.

9. A luminescent screen comprising a thin transparent crystalline film of luminescence-activated zinc phosphate on a smooth surface of a transparent refractory, non-oxidizing base.

10. A luminescent screen comprising a thin transparent crystalline film of luminescence-activated zinc phosphate on a smooth surface of a transparent refractory glass base.

References Cited in the file of this patent
UNITED STATES PATENTS

| | | |
|---|---|---|
| 2,312,229 | Anderson | Feb. 23, 1943 |
| 2,547,790 | Smith | Apr. 3, 1951 |
| 2,600,579 | Ruedy et al. | June 17, 1952 |
| 2,685,530 | Cusano et al. | Aug. 3, 1954 |